(12) United States Patent
Naka et al.

(10) Patent No.: US 7,568,989 B2
(45) Date of Patent: Aug. 4, 2009

(54) ROTATION TRANSMITTING APPARATUS AND VEHICLE STEERING APPARATUS

(75) Inventors: Masami Naka, Yamatotakada (JP); Tomoyasu Kada, Kaiduka (JP); Shiro Nakano, Osaka (JP); Kosuke Yamanaka, Kashiwara (JP); Atsushi Ishihara, Yamatokoriyama (JP); Kenji Higashi, Yamatokoriyama (JP); Daisuke Maeda, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 242 days.

(21) Appl. No.: 11/354,104

(22) Filed: Feb. 15, 2006

(65) Prior Publication Data

US 2006/0183589 A1 Aug. 17, 2006

(30) Foreign Application Priority Data

Feb. 16, 2005 (JP) ............................ 2005-039587
Mar. 30, 2005 (JP) ............................ 2005-099982

(51) Int. Cl.
*B62D 11/06* (2006.01)
(52) U.S. Cl. ............................ 475/30; 475/28
(58) Field of Classification Search ........... 475/28, 475/29, 30
See application file for complete search history.

(56) References Cited

U.S. PATENT DOCUMENTS

| | | | | |
|---|---|---|---|---|
| 3,511,104 A | * | 5/1970 | Piat | 74/388 R |
| 4,751,976 A | | 6/1988 | Higuchi et al. | |
| 5,511,629 A | | 4/1996 | Vogel | |
| 5,631,511 A | * | 5/1997 | Schulmann et al. | 310/83 |
| 5,906,250 A | * | 5/1999 | Haga et al. | 180/444 |
| 6,199,654 B1 | * | 3/2001 | Kojo et al. | 180/443 |
| 6,461,265 B1 | * | 10/2002 | Graham et al. | 475/5 |
| 7,247,111 B2 | * | 7/2007 | Yamanaka et al. | 475/2 |
| 2006/0166771 A1 | * | 7/2006 | Yamanaka et al. | 475/4 |

FOREIGN PATENT DOCUMENTS

| | | |
|---|---|---|
| DE | 19755312 A1 | 6/1999 |
| FR | 2094939 A | 2/1972 |
| JP | 61-122071 A | 6/1986 |
| JP | 61-122072 A | 6/1986 |
| JP | 61-122073 A | 6/1986 |
| JP | 61-122074 A | 6/1986 |
| JP | 61-122075 A | 6/1986 |
| JP | 61-122076 A | 6/1986 |
| JP | 61-122077 A | 6/1986 |
| JP | 6-2860 Y2 | 1/1994 |
| JP | 6-2861 Y2 | 1/1994 |
| JP | 2002-240729 A | 8/2002 |
| JP | 2002-240730 A | 8/2002 |
| JP | 2002-276749 A | 9/2002 |
| JP | 2002-295617 A | 10/2002 |
| JP | 2003-309957 A | 10/2003 |
| JP | 2003-312486 A | 11/2003 |
| JP | 2004-42829 A | 2/2004 |

* cited by examiner

*Primary Examiner*—David D. Le
(74) *Attorney, Agent, or Firm*—Birch, Stewart, Kolasch & Birch, LLP

(57) ABSTRACT

A rotation transmitting apparatus according to the present invention includes a first sun gear, a second sun gear, first planetary gears and second planetary gears. A carrier for supporting the respective planetary gears is integrally provided with a rotor of a speed change motor for changing a speed of rotation to be transmitted, so that the number of mesh portions in the gears is reduced. Further, the rotor is formed of a cylindrical shape and an input shaft for rotating the first sun gear is inserted into the rotor, so that a limited space is effectively used.

12 Claims, 7 Drawing Sheets

ROTATION TRANSMITTING APPARATUS AND VEHICLE STEERING APPARATUS

CROSS-REFERENCE TO RELATED APPLICATIONS

This non-provisional application claims priority under 35 U.S.C. §119(a) on Patent Application No. 2005-39587 filed in Japan on Feb. 16, 2005 and Patent Application No. 2005-99982 filed in Japan on Mar. 30, 2005, the entire contents of which are hereby incorporated by reference.

BACKGROUND OF THE INVENTION

1. Field of the Invention

The present invention relates to a rotation transmitting apparatus which can transmit rotation from an input side to an output side while changing a transmission ratio in a stepless manner and which is used for, for example, changing a correspondence between an operation amount of a steering member and that of a steering mechanism in a steering apparatus for a vehicle.

The present invention also relates to a vehicle steering apparatus in which an input shaft connected to steering means and an output shaft connected to a steering mechanism are interlockingly coupled to each other by a differential mechanism.

2. Description of Related Art

A steering operation of a vehicle is performed as follows. That is, a rotating operation applied to a steering member is transmitted to a steering mechanism via a column shaft, and the steering mechanism converts the rotating operation to a linear operation in a left-and-right direction of the vehicle, thereby changing a direction of wheels. In the case of performing such a steering operation, when the vehicle runs at low speed, a steering controlling operation amount of the wheels is made larger than a rotating operation amount of the steering member. In contrast, when the vehicle runs at high speed, the steering controlling operation amount of the wheels is made smaller than the rotating operation amount of the steering member. This can facilitate a driving operation at low-speed running, and can enhance stability at high-speed running.

Consequently, there has been practically used a steering apparatus in which a rotation transmitting apparatus for changing a transmission ratio to transmit rotation is arranged in a middle portion of a column shaft for coupling a steering member and a steering mechanism to each other, and which can transmit the rotation from the steering member side as an input side to the steering mechanism side as an output side while changing the transmission ratio. In addition, there has been practically used, for example, a rotation transmitting apparatus which includes a planetary gear mechanism and a motor for changing a rotational speed, and can change a transmission ratio in a stepless manner.

Japanese Utility Model Examined Publication No. 06-2860 (1994) proposes a steering apparatus which uses a planetary gear mechanism including a sun gear, a planetary gear and an internal gear. Herein, an input shaft is fixed to the sun gear, an output shaft is fixed to a carrier which couples a rotation shaft of the planetary gear, a motor for rotating the internal gear is provided, and a rotational speed of the internal gear is controlled, so that a transmission ratio of rotation from the input shaft to the output shaft is made variable. In this steering apparatus, if the internal gear is rotated in the same direction as a rotational direction of the input shaft by the motor, a rotational speed of the output shaft can be increased in accordance with a rotational speed of the internal gear. In contrast, if the internal gear is rotated in a reverse direction of the rotational direction of the input shaft, the rotational speed of the output shaft can be decreased in accordance with the rotational speed of the internal gear.

In addition, Japanese Patent Application Laid-Open No. 2002-240730 proposes a steering apparatus including a first internal gear rotating with a steering member, a first sun gear, a first planetary gear meshed with the first internal gear and the first sun gear, a second internal gear rotating with an output shaft, a second sun gear, and a second planetary gear meshed with the second internal gear and the second sun gear. Herein, the first sun gear and the second sun gear are rotated by a motor as a unit, so that a transmission ratio of rotation is made variable. In this steering apparatus, rotation of the first internal gear is transmitted to the second internal gear through rotational motion on their axes and orbital motion of the first planetary gear and the second planetary gear. At this time, if the sun gears rotating with each other are rotated in the same direction as a rotational direction of the first internal gear by the motor, a rotational speed of the second internal gear can be increased in accordance with a rotational speed of the sun gears. In contrast, if the sun gears are rotated in a reverse direction of the rotational direction of the first internal gear, the rotational speed of the second internal gear can be decreased.

On the other hand, a vehicle steering apparatus having a differential mechanism includes a sun gear provided to an input shaft connected to a steering wheel, a planetary gear meshed with the sun gear, a carrier arranged in coaxial with the sun gear and supporting the planetary gear so as to orbit around the sun gear freely, an output shaft coupled to a center portion of the carrier and connected to a steering mechanism, an internal gear rotating freely in coaxial with the output shaft and meshed with the planetary gear, and a differential electric motor having a drive gear meshed with an external toothed member provided on an outer periphery of the internal gear. Herein, when the steering wheel is operated, the steering mechanism is operated via the input shaft, the sun gear, the planetary gear and the output shaft. When the electric motor is driven, the internal gear is rotated, and the steering mechanism operates while increasing its operation speed via the output shaft connected to the carrier (see, for example, Japanese Patent Application Laid-Open No. 2003-312486).

The vehicle steering apparatus disclosed in Japanese Patent Application Laid-Open No. 2003-312486 also includes a first detector which detects a rotational angle of the input shaft, and a second detector which detects a rotational angle of the output shaft. Herein, drive circuits of first and second electric motors are controlled on the basis of values detected by the first and second detectors, and the like, and the rotational angle of the output shaft is compensated with respect to the rotational angle of the input shaft.

There has been also known a vehicle steering apparatus including a differential mechanism and a differential electric motor. Herein, the vehicle steering apparatus includes an input shaft connected to a steering wheel and provided with a transmission gear, an output shaft interlockingly coupled to a drive gear meshed with the transmission gear, and a reaction force electric motor applying a required torque to the input shaft in accordance with a torque applied to the output shaft. The reaction force electric motor is driven in the case where a steering torque applied to the input shaft is changed from an appropriate steering torque, for example, the output shaft is rotated while increasing its rotational speed by the differential electric motor. In addition, the reaction force electric motor applies a required torque to the input shaft in accordance with a torque applied to the output shaft, and corrects the torque so as to obtain an appropriate steering torque.

However, each time a running direction of a vehicle is changed, rotational directions of a steering member and column shaft are switched in the vehicle steering apparatus. Therefore, if a planetary gear mechanism is used in the steering apparatus, there arises a problem that an abnormal sound generates at mesh portions of the respective gears upon switching of the rotational directions. This abnormal sound is a collision sound generated when teeth of the respective gears are relatively moved within a range of backlash upon switching of the rotational directions and then are collided with each other. In addition, there is also generated a sliding sound generated when a gear is operated.

In the steering apparatus disclosed in each of Japanese Utility Model Examined Publication No. 06-2860 (1994) and Japanese Patent Application Laid-Open No. 2002-240730, at a mesh portion of the sun gear and the planetary gear and a mesh portion of the planetary gear and the internal gear, teeth of the respective gears are collided with each other, so that an abnormal sound generates. In addition, since the steering apparatus has a construction that three types of gears: a sun gear, a planetary gear and an internal gear are meshed, there arises a problem that a planetary gear mechanism becomes large in size, resulting in increase of the number of components and the number of assembling processes. In the steering apparatus disclosed in Japanese Utility Model Examined Publication No. 06-2860 (1994), another gear mechanism is used for transmission of rotation of a motor; therefore, there arises a problem of generation of an abnormal sound at a mesh portion in this gear mechanism.

In the vehicle steering apparatus including the differential mechanism as disclosed in Japanese Patent Application Laid-Open No. 2003-312486, further, it is necessary to provide the first detector for detecting the rotational angle of the input shaft and the second detector for detecting the rotational angle of the output shaft, there arises a problem of increase in cost of the vehicle steering apparatus due to cost of the detectors, the assembling work for the detectors, and the like. There also arises a problem that it is difficult to ensure an arrangement space of the vehicle steering apparatus in the case of mounting the apparatus onto a vehicle.

Also in the vehicle steering apparatus including the differential mechanism, the differential electric motor and the reaction force electric motor, it is necessary to provide a first detector for detecting a rotational angle of an input shaft and a second detector for detecting a rotational angle of an output shaft, resulting in the same problems as those in Japanese Patent Application Laid-Open No. 2003-312486.

BRIEF SUMMARY OF THE INVENTION

The present invention has been made with the aim of solving the above problems, and it is an object of the present invention to provide a rotation transmitting apparatus using a planetary gear mechanism. More specifically, the rotation transmitting apparatus includes a first sun gear, a first planetary gear, a second planetary gear and a second sun gear, wherein a carrier for supporting the respective planetary gears is integrally provided with a rotor of a motor and a rotational speed of the carrier is controlled to transmit rotation. Thus, mesh portions of the gears are only mesh portions between the sun gears and the planetary gears. Therefore, it is possible to decrease a collision sound of the gears, to decrease a sliding sound generated when the gears operate, to reduce the number of components and the number of assembling processes, and to reduce a size of the apparatus.

It is another object of the present invention to provide a vehicle steering apparatus capable of detecting a rotational angle of an input shaft and that of an output shaft without additionally providing an angle detector for the input shaft and that for the output shaft. It is still another object of the present invention to provide a vehicle steering apparatus capable of detecting a torque applied to an input shaft with good accuracy by reducing an influence of rotation frictional resistance due to a differential mechanism.

A rotation transmitting apparatus according to the first aspect is a rotation transmitting apparatus comprising: a first sun gear; a second sun gear supported in coaxial with the first sun gear; a first planetary gear meshed with said first sun gear; a second planetary gear meshed with said second sun gear and rotating with said first planetary gear; a carrier supporting said first planetary gear and second planetary gear on the respective axes rotatably, and rotating in coaxial with said first sun gear and second sun gear; and a motor varying a rotational speed of rotation transmitted by each of the gears, characterized in that said motor is disposed in coaxial with said first sun gear and second sun gear, and said motor has a rotor integrally provided with said carrier.

A rotation transmitting apparatus according to the second aspect is characterised in that said rotor is formed of a cylindrical shape, an input shaft rotating with said first sun gear or an output shaft rotating with said second sun gear is inserted into said rotor, and said carrier and said rotor are disposed so as to be relatively rotatable in coaxial with said input shaft or said output shaft.

A vehicle steering apparatus according to the third aspect is a vehicle steering apparatus comprising: an input shaft connected to steering means; an output shaft interlockingly coupled to the input shaft by a differential mechanism and connected to a steering mechanism; a first actuator allowing part of the differential mechanism to rotate; and a second actuator applying a required torque to the input shaft in accordance with a torque applied to the output shaft, wherein the first actuator includes a first electric motor having a first position detector for detecting a rotational position of a rotor, and the second actuator includes a second electric motor having a second position detector for detecting the rotational position of the rotor.

A vehicle steering apparatus according to the fourth aspect is characterized by further comprising: a first reduction mechanism disposed between said first electric motor and said differential mechanism; a second reduction mechanism disposed between said second electric motor and said input shaft; and calculation means for calculating a rotational angle of said input shaft and that of said output shaft on the basis of positions respectively detected by said first and second position detectors, a reduction ratio of said first reduction mechanism, and a reduction ratio of said second reduction mechanism.

A vehicle steering apparatus according to the fifth aspect is characterized by further comprising: a torque sensor detecting a torque applied to said input shaft, around said input shaft and on a side closer to said steering means than a portion where the input shaft is interlockingly coupled to said differential mechanism.

According to the first aspect, the first planetary gear rotates on its axis by the rotation applied to the first sun gear, the second planetary gear rotates with the first planetary gear by the rotation of the first planetary gear, and the second sun gear rotates by the rotational motion on its axis of the second planetary gear. Thus, the rotation is transmitted from the first sun gear to the second sun gear. Herein, if the motor integrally provided with the carrier allows the carrier to rotate in the same direction as (a reverse direction of) the rotational direction of the first sun gear, the respective planetary gears orbit with the carrier in the same direction as (a reverse direction of) the rotational direction of the first sun gear, so that the rotational speed of the second sun gear can be increased (decreased) by the revolution speed of the second planetary gear. Consequently, by controlling the rotational direction and rotational speed of the motor, it is possible to transmit rotation from an input side to an output side while changing a transmission ratio in a stepless manner. In addition, since mesh portions of the gears are only mesh portions between the sun gears and the planetary gears, it is possible to decrease a generated abnormal sound, which enables a silent operation. Further, since the number of components and the number of assembling processes can be reduced, it is possible to reduce cost of manufacturing a rotation transmitting apparatus.

According to the second aspect, the rotor of the motor is formed of a cylindrical shape, and the input shaft rotating with the first sun gear or the output shaft rotating with the second sun gear is inserted into the rotor. Thus, it is possible to effectively use a limited space and to reduce a size of the apparatus.

According to the third aspect, the steering means connected to the input shaft is operated, so that the output shaft rotates via the differential mechanism. Herein, if the rotational angle of the output shaft is smaller than that of the input shaft and the operation amount of the steering mechanism becomes smaller at the high-speed running, drive of the first and second electric motors is not controlled. Therefore, the rotational angle of the input shaft and that of the output shaft are not detected. If the first electric motor is driven on the basis of the rotational angle of the input shaft, the torque applied to the input shaft, the vehicle speed and the like, the first position detector detects the position of the rotor of the first electric motor, the differential mechanism partially rotates, and the output shaft rotates with respect to the input shaft while increasing its rotational speed. Further, the second electric motor is driven, the second position detector detects the position of the rotor of the second electric motor, and the input shaft rotates. The position detected by the second position detector of the second electric motor which allows the input shaft to rotate serves as a rotational angle of the input shaft. In addition, the position detected by the first position detector of the first electric motor which allows the output shaft to rotate serves as a rotational angle of the output shaft. Thus, a phase difference between the input shaft and the output shaft can be detected. As described above, since the phase difference between the input shaft and the output shaft can be detected by the position detectors of the first and second electric motors, it is unnecessary to additionally provide an angle detector for the input shaft and that for the output shaft. Therefore, it is possible to make a structure of the rotation transmitting apparatus simpler than that of a conventional rotation transmitting apparatus which requires position detectors on input and output shaft sides, and to reduce cost of manufacturing the rotation transmitting apparatus.

According to the fourth aspect, the rotational speed of the first electric motor is decelerated by the first reduction mechanism, and the rotation is transmitted from the differential mechanism to the output shaft. In addition, the rotational speed of the second electric motor is decelerated by the second reduction mechanism, and the rotation is transmitted to the input shaft. Thus, it is possible to make resolutions of the first and second position detectors highly accurate, and to detect a phase difference between the input shaft and the output shaft with high accuracy.

According to the fifth aspect, since the torque sensor which detects a torque applied to the input shaft is provided on the opposite side of the output shaft with respect to a portion where the input shaft is interlockingly coupled to the differential mechanism, it is possible to decrease an influence of rotation frictional resistance due to the differential mechanism and to detect a torque with good accuracy. It is therefore possible to enhance a control accuracy in the case of controlling the first and second electric motors on the basis of this detected torque and the like.

The above and further objects and features of the invention will more fully be apparent from the following detailed description with accompanying drawings.

DETAILED DESCRIPTION OF THE INVENTION

The following description will explain in detail the present invention, based on the drawings illustrating some embodiments thereof.

Embodiment 1

Figure 1:
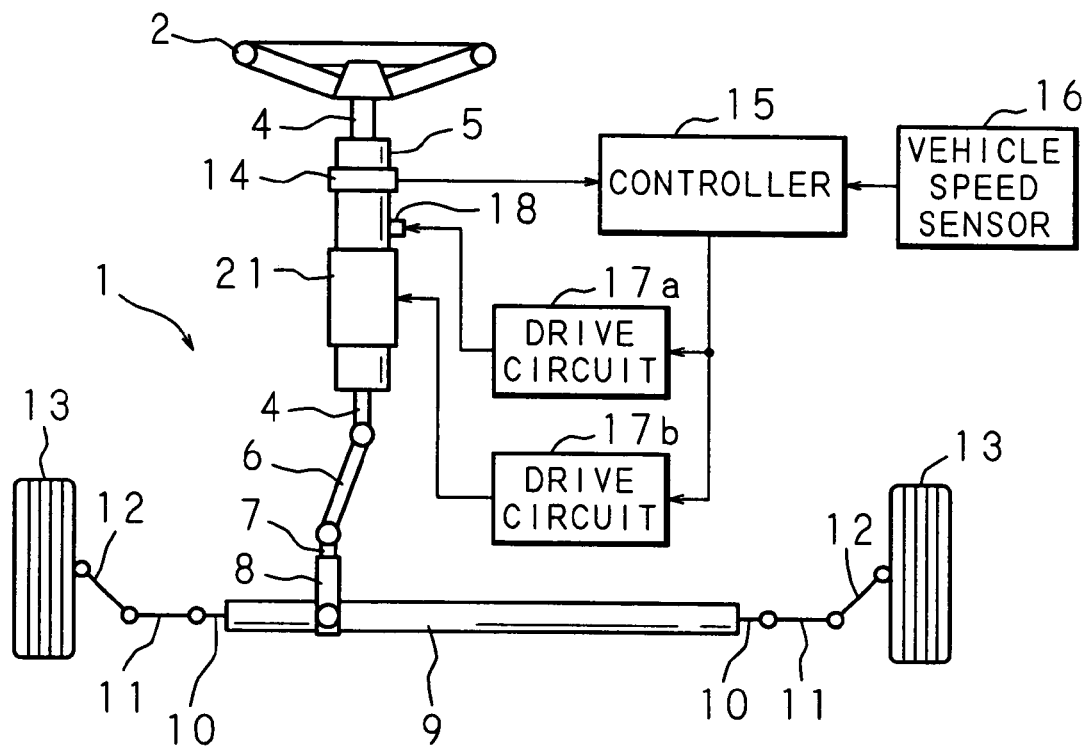
FIG. 1 is a schematic view showing an example of application of a rotation transmitting apparatus according to the present invention in a steering apparatus for a vehicle.

FIG. 1 is a schematic view showing an example of application of a rotation transmitting apparatus according to the present invention in a steering apparatus for a vehicle. In FIG. 1, a reference numeral 1 denotes a rack and pinion type steering apparatus which includes a rack shaft 10 supported in a freely movable manner in an axial direction on an interior of a cylindrical rack housing 9 extending in a left-and-right direction of a vehicle body. Tie rods 11 are coupled to both ends of the rack shaft 10 that protrude from both sides of the rack housing 9. Ends of the tie rods 11 on the opposite side of the coupling portions with the rack shaft 10, are connected with wheels 13 for steering via respective knuckle arms 12. When the rack shaft 10 moves in the axial direction, the knuckle arms 12 are pushed/pulled via the tie rods 11 so as to steer the wheels 13 to the left or right.

A pinion housing 8 in a cylindrical shape which intersects with the rack housing 9 is continuously provided in the vicinity of one end of the rack housing 9. A pinion shaft 7 is supported on an interior of the pinion housing 8 in a rotatable manner about its axis. A pinion gear (not illustrated) is integrally formed on a lower portion of the pinion shaft 7, and is meshed with a rack gear (not illustrated) formed at a corresponding portion of the rack shaft 10 at an intersection with the rack housing 9.

A column shaft 4 is coupled via an intermediate shaft 6 to an upper end of the pinion shaft 7 protruding from an upper portion of the pinion housing 8. The column shaft 4 is supported on an interior of a column housing 5 fixed to and supported by an appropriate site of the vehicle body, in a rotatable manner about its axis. In addition, the column shaft 4 is divided into an input shaft 4a and an output shaft 4b in the interior of column housing 5 (see FIG. 2). A steering member 2 is coupled to the input shaft 4a protruding from an upper end of the column housing 5, and the intermediate shaft 6 is coupled to the output shaft 4b protruding from a lower end of the column housing 5.

A rotation transmitting apparatus according to the present invention is provided on a lower portion of the column housing 5 and in an interior of a gear housing 21 obtained by expanding a diameter of the column housing 5. The rotation transmitting apparatus transmits rotation from the input shaft 4a to the output shaft 4b, while changing a transmission ratio in a stepless manner. A steering angle sensor 14 for detecting a rotational angle of the steering member 2 is disposed on an upper portion of the column housing 5. A reaction force motor 18 for generating an additional torque which varies an operation torque of the steering member 2 is disposed on an outside of the column housing 5 in the vicinity of an upper end of the gear housing 21. Thus, a driver can feel good steering due to the additional torque generated by the reaction force motor 18.

Figure 2:
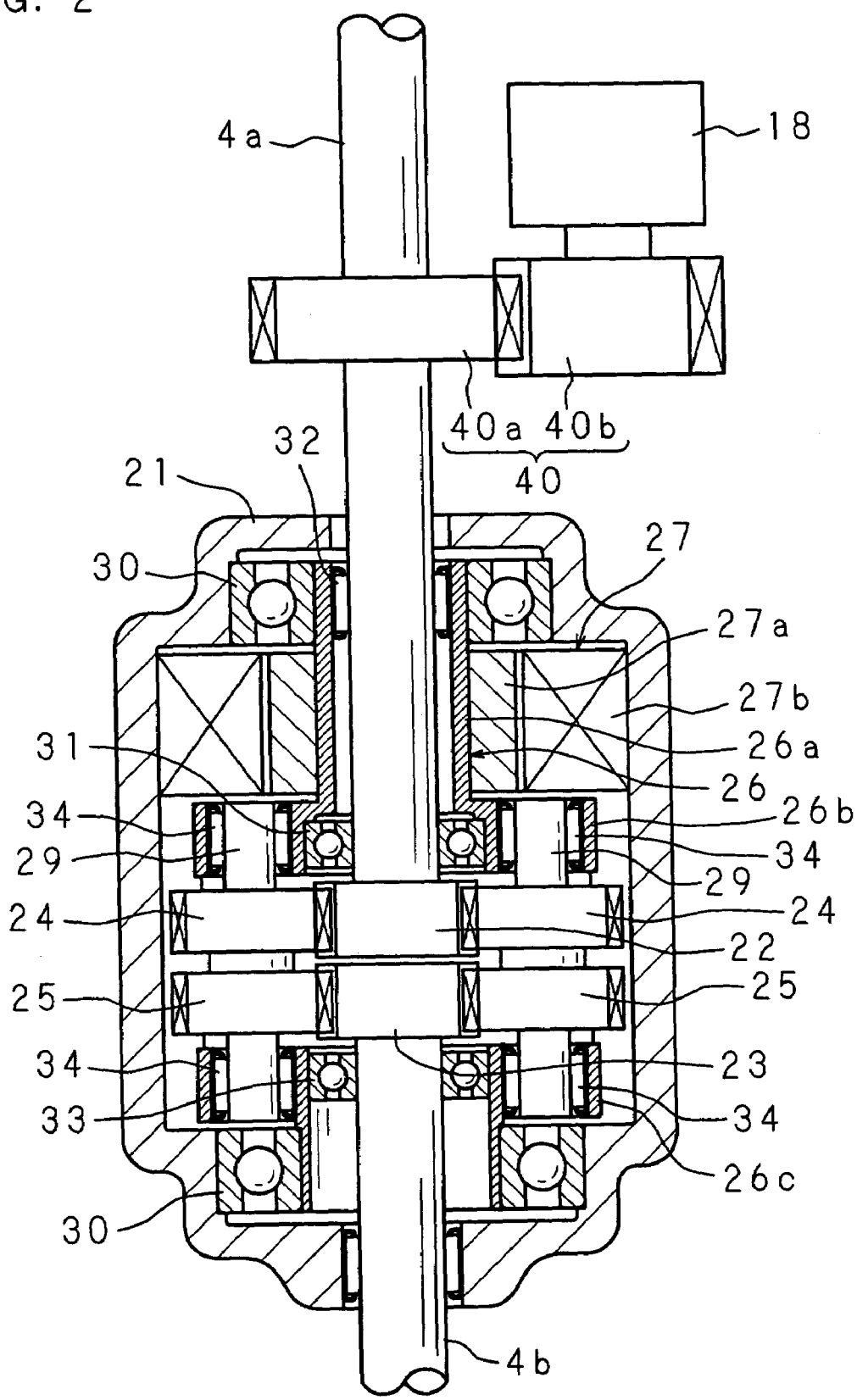
FIG. 2 is a vertical sectional view showing a construction of the rotation transmitting apparatus according to the present invention.

The rotation transmitting apparatus in the gear housing 21 includes a speed change motor 27 for changing a transmission ratio (see FIG. 2). The speed change motor 27 and the reaction force motor 18 are driven to rotate by a drive circuit 17a and a drive circuit 17b, respectively. A controller 15 which controls operations of the drive circuit 17a and drive circuit 17b receives a rotational angle of the steering member 2 detected by the steering angle sensor 14 and a running speed of a vehicle detected by a vehicle speed sensor 16 to provide a driving instruction to the drive circuit 17a and drive circuit 17b so that the speed change motor 27 and the reaction force motor 18 are rotated in a rotational direction and at a rotational speed according to the detection results.

FIG. 2 is a vertical sectional view showing a construction of the rotation transmitting apparatus according to the present invention. The input shaft 4a and output shaft 4b which constitute the column shaft 4 are arranged in such a manner that a lower end of the input shaft 4a and an upper end of the output shaft 4b are opposed to each other in the interior of the gear housing 21. A first sun gear 22 is integrally formed with the lower end of the input shaft 4a, and a second sun gear 23 is integrally formed with the upper end of the output shaft 4b. Herein, the input shaft 4a, the first sun gear 22, the second sun gear 23 and the output shaft 4b are designed to rotate in coaxial with one another.

Two first planetary gears 24 are meshed with an outer peripheral tooth portion of the first sun gear 22. In addition, two second planetary gears 25 are meshed with an outer peripheral tooth portion of the second sun gear 23. The first planetary gears 24 and the second planetary gears 25 are continuously fixed to supporting shafts 29 so as to rotate coaxially with each other. The supporting shafts 29 are pivotally supported by a carrier 26 (to be described later) which rotates relative to the input shaft 4a and the output shaft 4b in such a manner that the supporting shafts 29 are parallel to the input shaft 4a and the output shaft 4b.

Figure 3:
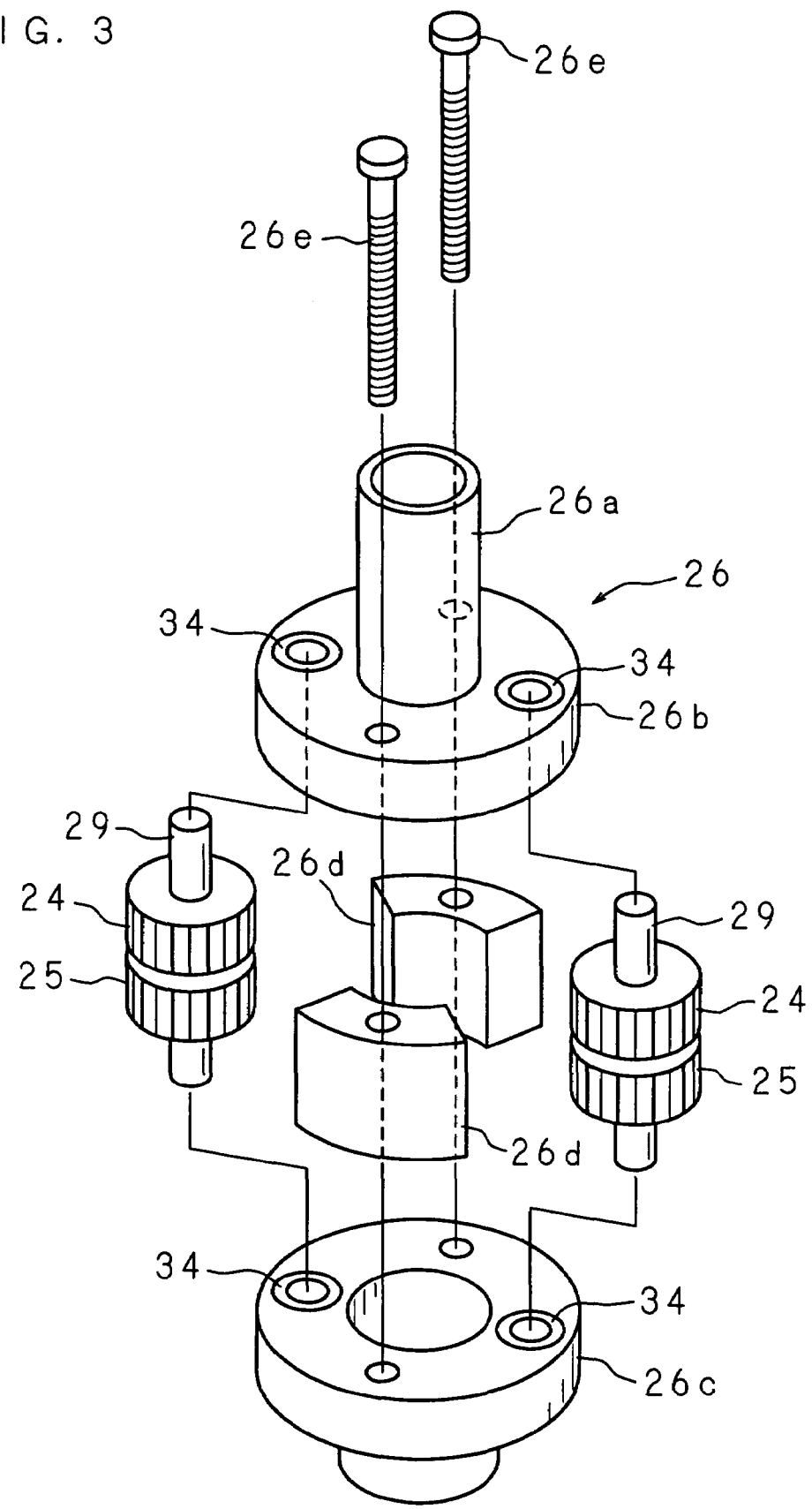
FIG. 3 is an exploded perspective view showing a construction of a carrier of the rotation transmitting apparatus according to the present invention.

FIG. 3 is an exploded perspective view showing a construction of the carrier 26 of the rotation transmitting apparatus according to the present invention. The carrier 26 includes a cylindrical rotor 26a, disk-shaped first and second carrier plates 26b and 26c, and two coupling members 26d for coupling the first and second carrier plates 26b and 26c. The rotor 26a is a rotor of a direct drive type motor, and is fixed to the first carrier plate 26b by a method such as integral molding or welding. The input shaft 4a is inserted into through holes (not illustrated) provided at a center of the rotor 26a and a center of the first carrier plate 26b, and supports the rotor 26a and the first carrier plate 26b such that the rotor 26a and the first carrier plate 26b are relatively rotatable in coaxial with each other.

Each of the supporting shafts 29 for integrally fixing the first planetary gear 24 and the second planetary gear 25 is pivotally supported by needle bearings 34 between the first carrier plate 26b and the second carrier plate 26c. The needle bearings 34 are symmetrically arranged with a through hole of the carrier plate 26b or a through hole of the carrier plate 26c positioned therebetween, with respect to the carrier plates 26b and 26c respectively. The first carrier plate 26b and the second carrier plate 26c are coupled by the two coupling members 26d, and are fixed by screws 26e. The output shaft 4b is inserted into the through hole provided at the center of the second carrier plate 26c, and supports the second carrier plate 26c such that the second carrier plate 26c is relatively rotatable in coaxial therewith.

The carrier 26 is supported on the gear housing 21 by a ball bearing 30 so as to be relatively rotatable in coaxial with the input shaft 4a and output shaft 4b, with the first planetary gears 24, the second planetary gears 25 and the supporting shafts 29. The carrier 26 is also supported on the input shaft 4a by a ball bearing 31 and a needle bearing 32, and further supported on the output shaft 4b by a ball bearing 33. As described above, the carrier 26 can stably rotate by the supports from both inside and outside thereof.

Plural magnets 27a are disposed along an outer peripheral face of the rotor 26a of the carrier 26 in such a manner that an N pole and an S pole are alternately disposed. A coil 27b is provided around an inner circumference of the gear housing 21 at a position facing the magnets 27a. The rotor 26a, the magnets 27a and the coil 27b constitute the direct drive type speed change motor 27 which rotates in coaxial with the input shaft 4a. It is therefore possible to control the rotational direction and rotational speed of the carrier 26 having the rotor 26a and to transmit the rotation of the input shaft 4a to the output shaft 4b while changing a transmission ratio in a stepless manner.

Moreover, the reaction force motor 18 is connected via a reduction gear mechanism 40 to the middle portion of the input shaft 4a of the column shaft 4. The reduction gear mechanism 40 has a first gear 40a which is integrally formed with an outer periphery of the input shaft 4a, and a second gear 40b which is meshed with the first gear 40a and is coupled to an output shaft of the reaction force motor 18. The reaction force motor 18 generates an additional torque which varies the operation torque of the steering member 2 without changing a transmission ratio of the rotation from the input shaft 4a to the output shaft 4b. The additional torque generated by the reaction force motor 18 is a resistance to a rotating operation applied to the steering member 2 by a driver. The controller 15 controls the drive circuit 17a for driving the reaction force motor 18 in such a manner that a large additional torque is generated when a vehicle runs at high speed and a small additional torque is generated when a vehicle runs at low speed, for example.

In the steering apparatus including the rotation transmitting apparatus having the aforementioned construction, if the steering member 2 is operated for steering, the input shaft 4a of the column shaft 4 coupled to the steering member 2 rotates and, also, the first sun gear 22 formed on an end of the input shaft 4a rotates.

Herein, if the speed change motor 27 is not driven to rotate and the carrier 26 does not rotate, the first planetary gears 24 rotate about the respective supporting shafts 29 by the rotation of the first sun gear 22, and the second planetary gears 25 rotate with the first planetary gears 24. By the rotation of the second planetary gears 25, the second sun gear 23 rotates. This rotation is transmitted from the output shaft 4b to the pinion shaft 7 via the intermediate shaft 6 and, then, is converted into the movement of the rack shaft 10 in the axial direction, so that the direction of the wheels 13 is changed.

The transmission of the rotation from the input shaft 4a having the first sun gear 22 to the output shaft 4b having the second sun gear 23 is performed on the basis of a fixed transmission ratio determined in accordance with a ratio between the number of teeth of the first planetary gears 24 and the number of teeth of the second planetary gears 25. The wheels 13 are steered in the operating direction of the steering member 2 by an angle corresponding to an operation amount.

In contrast, if the speed change motor 27 is driven to rotate and the carrier 26 is rotated in the same direction as the rotational direction of the input shaft 4a, rotation of the first sun gear 22 is transmitted to the second sun gear 23 via rotational motion on their axes of the first planetary gears 24 and second planetary gears 25 that orbit with the carrier 26, and the second sun gear 23 is rotated at a speed increased rather than the rotational speed of the first sun gear 22 by an orbital speed of the carrier 26 by the motor. Herein, transmission of the rotation from the input shaft 4a to the output shaft 4b is speed increasing transmission performed at a fixed transmission ratio or more determined in accordance with a ratio between the number of teeth of the first planetary gears 24 and the number of teeth of the second planetary gears 25. The wheels 13 are steered at an angle larger than an angle corresponding to an operation amount of the steering member 2.

On the other hand, if the speed change motor 27 is driven to rotate and the carrier 26 is rotated in a reverse direction of the rotational direction of the input shaft 4a, the second sun gear 23 is rotated at a speed decreased rather than the rotational speed of the first sun gear 22 by a revolution speed of the carrier 26. Herein, transmission of the rotation from the input shaft 4a to the output shaft 4b is speed decreasing transmission performed at a fixed transmission ratio or less determined in accordance with a ratio between the number of teeth of the first planetary gears 24 and the number of teeth of the second planetary gears 25. The wheels 13 are steered at an angle smaller than an angle corresponding to an operation amount of the steering member 2.

The controller 15 determines the rotational direction and rotational speed of the speed change motor 27 in accordance with results of detection by the steering angle sensor 14 and vehicle speed sensor 16, and issues a driving instruction to the drive circuit 17b, thereby controlling the rotational direction and rotational speed of the speed change motor 27. Thus, if a transmission ratio is controlled so as to be high at low-speed running and to be small at high-speed running, for example, a driving operation at low-speed running can be easily performed and stability at high-speed running can be enhanced. In order to provide a resistance to a rotating operation of the steering member 2 by a driver, the controller 15 controls rotation of the reaction force motor 18, and generates a small additional torque at low-speed running and a large additional torque at high-speed running, so that the driver can feel good steering.

In the rotation transmitting apparatus according to the present invention, the rotor of the direct drive type speed change motor 27 is designed as the rotor 26a integrally provided with the first carrier plate 26b of the carrier 26, so that the number of teeth of gears can be reduced in comparison with a conventional rotation transmitting apparatus. Therefore, it is possible to suppress a collision sound of gears generated at the time of switching of a rotational direction and a sliding sound generated when gears operate. Further, it is possible to reduce the size of the rotation transmitting apparatus and to reduce cost by reduction of the number of components and the number of assembling processes.

In Embodiment 1, the number of first planetary gears 24 and the number of second planetary gears 25 are two, respectively. However, the present invention is not limited thereto, and the number thereof may be one, or three or more, respectively. In addition, the rotor of the direct drive type speed change motor 27 is integrally provided with the first carrier plate 26b; however, the rotor may be integrally provided with the second carrier plate 26c. Further, the first carrier plate 26b, the second carrier plate 26c and the coupling members 26d are fixed by the screws 26e. However, the present invention is not limited to this construction, and these components may be fixed by another method such as welding or integral molding. The reaction force motor 18 may be of a direct drive type, and may not be provided in the rotation transmitting apparatus. The rotation transmitting apparatus according to the present invention may be applied to another apparatus in addition to the steering apparatus for a vehicle. The rotation transmitting apparatus according to the present invention has a construction that transmission of rotation is performed by plural gears, however, the present invention is not limited to this construction, and the similar construction may be applied to a rotation transmitting apparatus which transmits rotation using a pulley and a belt.

Embodiment 2

Figure 4:
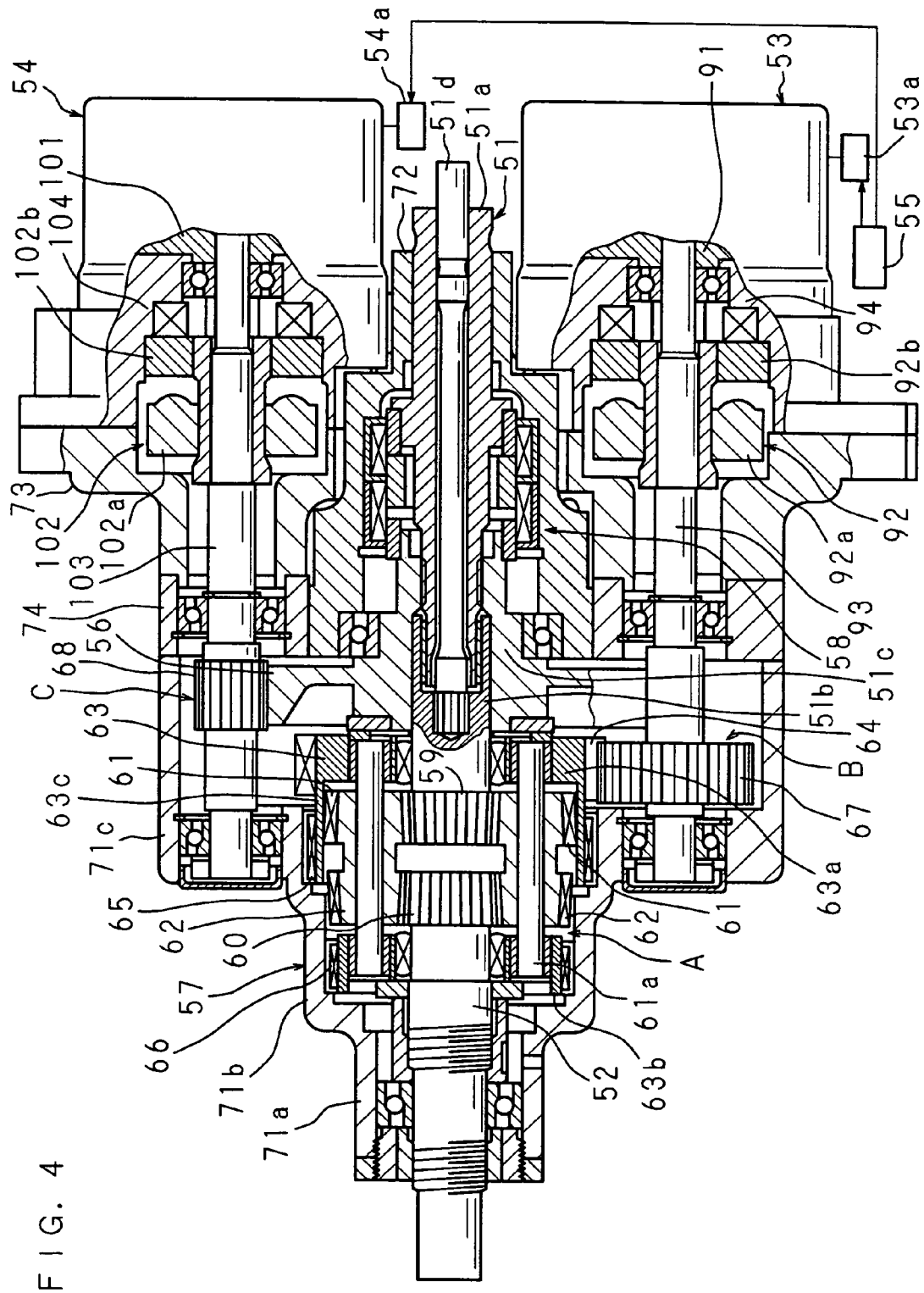
FIG. 4 is a sectional view showing a construction of a vehicle steering apparatus according to Embodiment 2 of the present invention.
Figure 5:
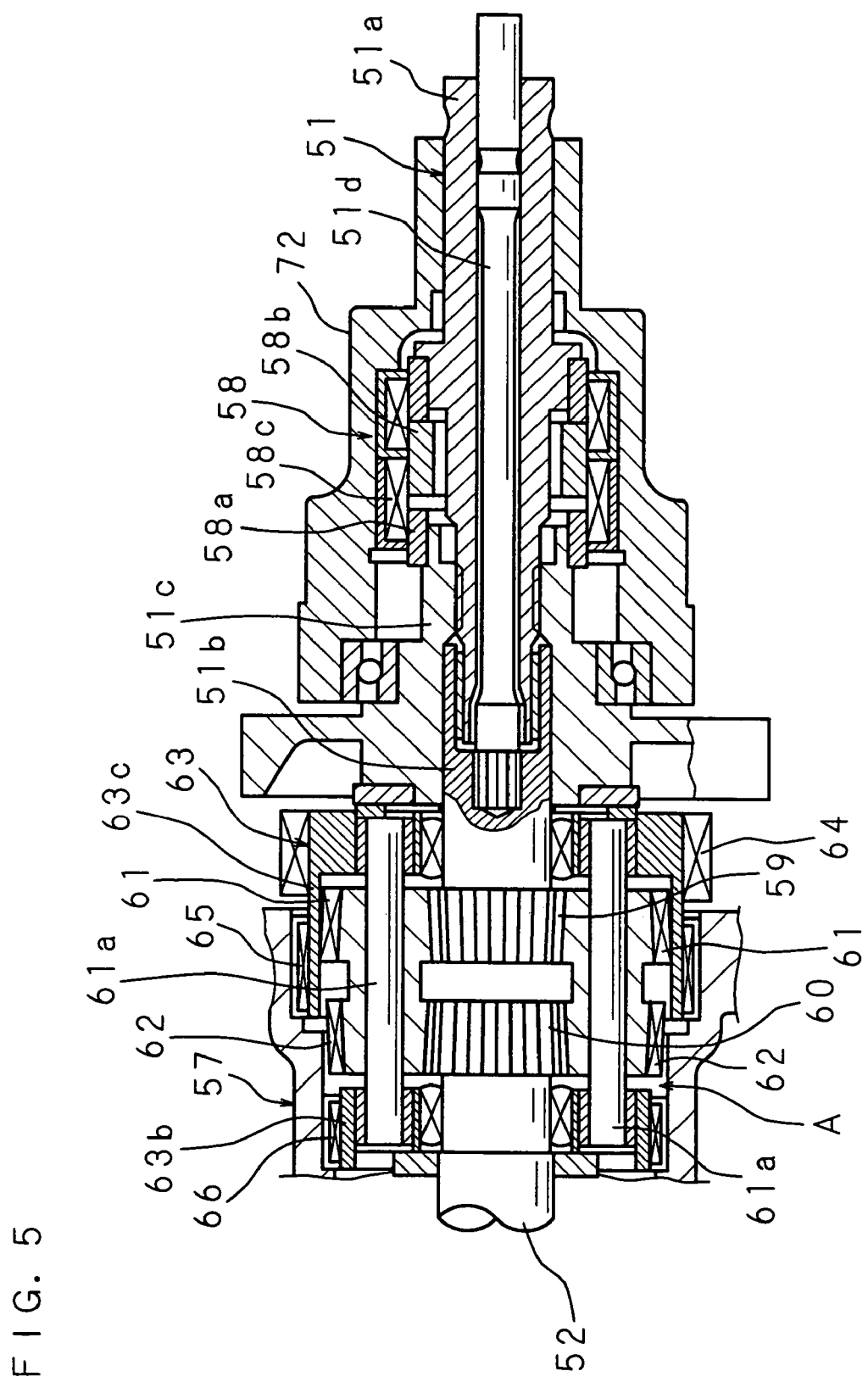
FIG. 5 is an enlarged sectional view of a main part showing the construction of the vehicle steering apparatus according to Embodiment 2 of the present invention.
Figure 6:
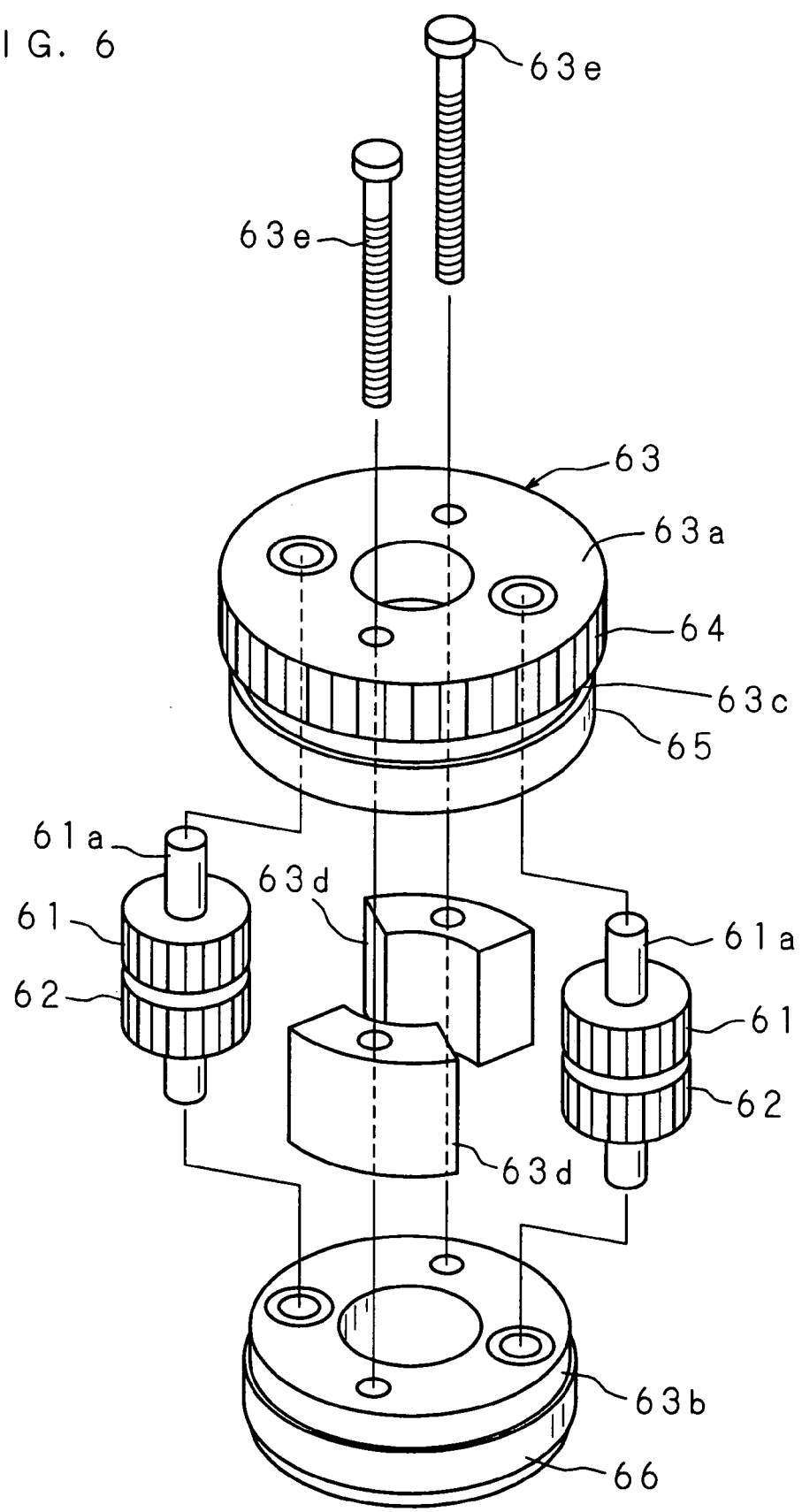
FIG. 6 is a schematic perspective view of a carrier portion showing the construction of the vehicle steering apparatus according to Embodiment 2 of the present invention.

FIG. 4 is a sectional view showing a construction of Embodiment 2 of the vehicle steering apparatus according to the present invention. FIG. 5 is an enlarged sectional view of a main part. FIG. 6 is a schematic perspective view of a carrier portion.

This vehicle steering apparatus includes an input shaft 51, an output shaft 52, a first electric motor 53, a second electric motor 54 and a controller 55. Herein, the input shaft 51 has one end connected to a steering wheel serving as steering means. The output shaft 52 has one end interlockingly coupled to the other end of the input shaft 51 by a differential mechanism A and the other end connected to, for example, a rack and pinion type steering mechanism. The first electric motor 53 serves as a first actuator for rotating the output shaft 52 with respect to the input shaft 51 while increasing a rotational speed. The second electric motor 54 is used for a reaction force for applying a required torque to the input shaft 51 in accordance with a torque applied to the output shaft 52, in other words, serves as a second actuator for applying, to the input shaft 51, a reaction force torque in the same direction as that of the torque applied to the input shaft 51 when the torque applied to the input shaft 51 is changed from an appropriate torque. The controller 55 controls drive circuits 53a and 54a of the first and second electric motors 53 and 54.

The input shaft 51 and the output shaft 52 are coaxially arranged while being spaced away from each other. The input shaft 51 has a cylindrical first shaft body 51a, a second shaft body 51b, a third shaft body 51c and a torsion bar 51d. Herein, the first shaft body 51a has one end connected to the steering wheel. The second shaft body 51b has one end fitted to the other end of the first shaft body 51a so as to be freely rotatable and the other end provided with a first sun gear to be described later. The third shaft body 51c is fitted and fixed to one end of the second shaft body 51b and has an outer periphery integrally provided with a second large gear 56. The torsion bar 51d interlockingly couples the first shaft body 51a and the second shaft body 51b to each other and is twisted by an operating force of the steering wheel. The first shaft body 51a and the third shaft body 51c are supported on a housing 57 by a bearing so as to be freely rotatable. The output shaft 52 is supported on the housing 57 by a bearing so as to be freely rotatable.

A torque sensor 58 for detecting a torque applied to the input shaft 51 is provided around an outer periphery of the input shaft 51 and on the opposite side of the output shaft 52 with respect to a portion where the input shaft 51 is interlockingly coupled to the differential mechanism A (a portion where the input shaft 51 is interlockingly coupled to a first sun gear 59 to be described later).

The torque sensor 58 is arranged around the first shaft body 51a and the third shaft body 51c and has two magnetic rings 58a and 58b having a rectangular tooth portion formed in a circumferential direction thereof, and a coil 58c arranged around outer peripheries of the magnetic rings 58a and 58b and generating a magnetic flux. When the magnetic rings 58a and 58b are relatively rotated in correspondence with twist of the torsion bar 51d, an opposing area of the tooth portion is changed, and the torque is detected by a change in impedance of the coil 58c.

The differential mechanism A includes a first sun gear 59 which is integrally provided with the other end of the input shaft 51, a second sun gear 60 which is integrally provided with one end of the output shaft 52, plural first planetary gears 61 which are meshed with the first sun gear 59, plural second planetary gears 62 which rotate with the first planetary gears 61 coaxially and are meshed with the second sun gear 60, and a carrier 63 which supports the first and second planetary gears 61 and 62.

The first and second planetary gears 61 and 62 are integrally formed coaxially, and a shaft body 61a is inserted into through holes provided at center portions of these planetary gears 61 and 62. Both ends of the shaft body 61a are supported on the carrier 63 through needle roller bearings so as to be freely rotatable.

Each of the first and second planetary gears 61 and 62 and first and second sun gears 59 and 60 is constituted of a spur gear. If rotation of the input shaft 51 is transmitted to the output shaft 52, a torque ratio between a torque applied to the output shaft 52 and a torque applied to the input shaft 51 is set to an appropriate torque ratio ranging from 1:0.7 to 1:0.9. This torque ratio is calculated from the following expression:

$$(Z1 \div Z2) \times (Z3 \div Z4),$$

wherein Z1 represents the number of teeth of the first sun gear 59, Z2 represents the number of teeth of the first planetary gear 61, Z3 represents the number of teeth of the second planetary gear 62 and Z4 represents the number of teeth of the second sun gear 60. The torque ratio ranging from 1:0.7 to 1:0.9 is determined on the basis of rotational speeds of the first and second electric motors 53 and 54, a rotational speed of the carrier 63, power consumption of the first and second electric motors 53 and 54, and the like.

The carrier 63 has an annular first plate part 63a, an annular second plate part 63b, coupling members 63d and a cylindrical part 63c. Herein, the first plate part 63a is fitted to and supported on an outer periphery of the input shaft 51 through a needle roller bearing so as to be freely rotatable. The second plate part 63b is fitted to and supported on an outer periphery of the output shaft 52 through a needle roller bearing so as to be freely rotatable. The coupling members 63d couple plural portions of the outer peripheries of the first and second plate parts 63a and 63b. The cylindrical part 63c is continued to the outer periphery of the first plate part 63a and is arranged on an outside of the first planetary gear 61. An annular first large gear 64 constituted of a spur gear is integrally provided on the outer periphery of the first plate part 63a serving as one side in a direction of a center axis line. Needle roller bearings 65 and 66 are fitted to the cylindrical part 63c serving as the other side in the direction of the center axis line and the outer periphery of the second plate part 63b. The carrier 63 is supported in the housing 57 at only one end via the needle roller bearings 65 and 66 so as to be freely rotatable. It is to be noted that the coupling members 63d are coupled to each other by screws 63e passing through the coupling members 63d and the first and second plate parts 63a and 63b.

The first electric motor 53 has a rotor 91 which is arranged in parallel with the input shaft 51 and the output shaft 52, and a first position detector 92 which detects a position of the rotor 91. The first electric motor 53 is constituted of a blushless DC motor which electronically rectifies a current by the first position detector 92 and a semiconductor switch. Herein, a drive circuit 53a is connected to a controller 55. The rotor 91 is coaxially coupled with a drive shaft 93. A first small gear 67 provided on a middle portion of the drive shaft 93 is meshed with the first large gear 64.

The second electric motor 54 has a rotor 101 which is arranged in parallel with the input shaft 51 and the output shaft 52, and a second position detector 102 which detects a position of the rotor 101. The second electric motor 54 is constituted of a blushless DC motor which electronically rectifies a current by the second position detector 102 and a semiconductor switch. Herein, a drive circuit 54a is connected to the controller 55. The rotor 101 is coaxially coupled with a drive shaft 103. A second small gear 68 provided on a middle portion of the drive shaft 103 is meshed with the second large gear 56 integrally provided on a middle portion of the input shaft 51.

The first large gear 64 and the first small gear 67 constitute a first reduction mechanism B, and the second large gear 56 and the second small gear 68 constitute a second reduction mechanism C.

The first position detector 92 is constituted of a resolver which has a detection rotor 92a which is fixed to an outer periphery of the drive shaft 93 and rotates with the rotor 91, and a detection stator 92b which is arranged around the detection rotor 92a and is held in a motor case 94. The detection stator 92b detects a change in rotational position of the detection rotor 92a as a change in impedance to thereby detect a rotational position of the rotor 91.

The second position detector 102 is constituted of a resolver which has a detection rotor 102a which is fixed to an outer periphery of the drive shaft 103 and rotates with the rotor 101, and a detection stator 102b which is arranged around the detection rotor 102a and is held in a motor case 104. The detection stator 102b detects a change in rotational position of the detection rotor 102a as a change in impedance to thereby detect a rotational position of the rotor 101.

The detection stator 92b and 102b of the first and second position detectors 92 and 102 are connected to the controller 55. The controller 55 includes calculation means for calculating rotational angles of the input shaft 51 and output shaft 52 on the basis of positions detected by the first and second position detectors 92 and 102, a reduction ratio of the first reduction mechanism B, and a reduction ratio of the second reduction mechanism C.

The controller 55 is constituted of a microprocessor. The torque sensor 58 and the first and second position detectors 92 and 102 are connected to an input part of the controller 55. The drive circuits 53a and 54a of the first and second electric motors 53 and 54 and are connected to an output part of the controller 55.

Since the input shaft 51 and the output shaft 52 are interlockingly coupled to each other by the differential mechanism A, a rotational angle $\theta 1$ of the input shaft 51 and a rotational angle $\theta 2$ of the output shaft 52 are calculated from the following equations:

$$\theta 1 = \theta 5 = \theta 4 \times C' \quad (1)$$

$$\theta 6 = \theta 3 \times B' \quad (2), \text{ and}$$

$$\theta 2 = (Y \times \theta 5) + \{(1-Y) \times \theta 6\} \quad (3),$$

wherein $\theta 3$ represents a detection position (detection angle) detected by the first position detector 92, $\theta 4$ represents a detection position (detection angle) detected by the second position detector 102, $\theta 5$ represents a rotational angle of the first sun gear 59, $\theta 6$ represents a rotational angle of the carrier 63, B' represents a reduction ratio of the first reduction mechanism B, C' represents a reduction ratio of the second reduction mechanism C, and Y represents a torque ratio between a torque applied to the carrier 63 via the first reduction mechanism B and a torque applied to the first sun gear 59 via the second reduction mechanism C. This torque ratio Y ranges from 1:0.7 to 1-0.9, as described above.

The housing 57 includes a first cylinder body 71, a second cylinder body 72, a third cylinder body 73 and an annular coupling plate 74. Herein, the first cylinder body 71 has a small-diameter cylindrical part 71a which accommodates and supports the output shaft 52 therein, a middle-diameter cylindrical part 71b which accommodates and supports the carrier 63 therein, and a large-diameter cylindrical part 71c which accommodates and supports the first and second small gears 67 and 68 therein. The second cylinder body 72 accommodates and supports the input shaft 51 and the torque sensor 58 therein. The third cylinder body 73 accommodates one end of the second cylinder body 72 therein. The coupling plate 74 couples the first cylinder body 71 and the third cylinder body 73 to each other.

The steering mechanism is of a rack and pinion type, and includes a pinion gear and a rack shaft which has rack gear meshed with the pinion gear and enables its movement in an axial direction. The pinion gear is interlockingly coupled to the output shaft 52 via a universal joint and an intermediate shaft. Steering control wheels are supported on both ends of the rack shaft.

In the vehicle steering apparatus configured as described above, when the input shaft 51 is rotated by the operation of the steering wheel, the output shaft 52 rotates at an equal speed to the rotational speed of the input shaft 51 via the first sun gear 59, the first and second planetary gears 61 and 62 and the second sun gear 60. When the first electric motor 53 is driven by an instruction signal output from the controller 55 to the drive circuit 53a, the carrier 63 rotates via the first reduction mechanism B, and the output shaft 52 rotates while increasing its rotational speed via the first and second planetary gears 61 and 62 and the second sun gear 60. When a steering torque applied to the input shaft 51 is changed from an appropriate torque by this increase in the rotational speed of the output shaft 52, the second electric motor 54 is driven by an instruction signal output from the controller 55 to the drive circuit 54a in accordance with a torque applied to the output shaft 52, and the like. For example, a reaction force torque in the same direction as the rotational direction of the input shaft 51 is applied to the input shaft 51 via the second reduction mechanism C. As a result, a torque ratio between the output shaft 52 and the input shaft 51 can be maintained at a predetermined value ranging from 1:0.7 to 1:0.9, and a steering torque applied to the input shaft 51 can be maintained at an appropriate value.

When the first and second electric motors 53 and 54 are driven, the first position detector 92 detects a rotational position of the rotor 91 and the second position detector 102 detects a rotational position of the rotor 101. Values detected by the first and second position detectors 92 and 102 are input to the controller 55, and the calculation means of the controller 55 calculates a rotational angle of the input shaft 51 and a rotational angle of the output shaft 52. As a result, a phase difference between the input shaft 51 and the output shaft 52 can be detected, and the rotational angle of the output shaft 52 with respect to the input shaft 51 can be corrected by this phase difference.

The input shaft 51 is rotated by the operation of the steering wheel, so that the torsion bar 51d is twisted. When a torque is applied to the input shaft 51, the torque sensor 58 detects this torque. Then, the detected torque is input to the controller 55, and the controller 55 outputs instruction signals to the drive circuits 53a and 54a. As a result, the drive of the first and second electric motors 53 and 54 is controlled in accordance with the torque applied to the input shaft 51.

Embodiment 3

Figure 7:
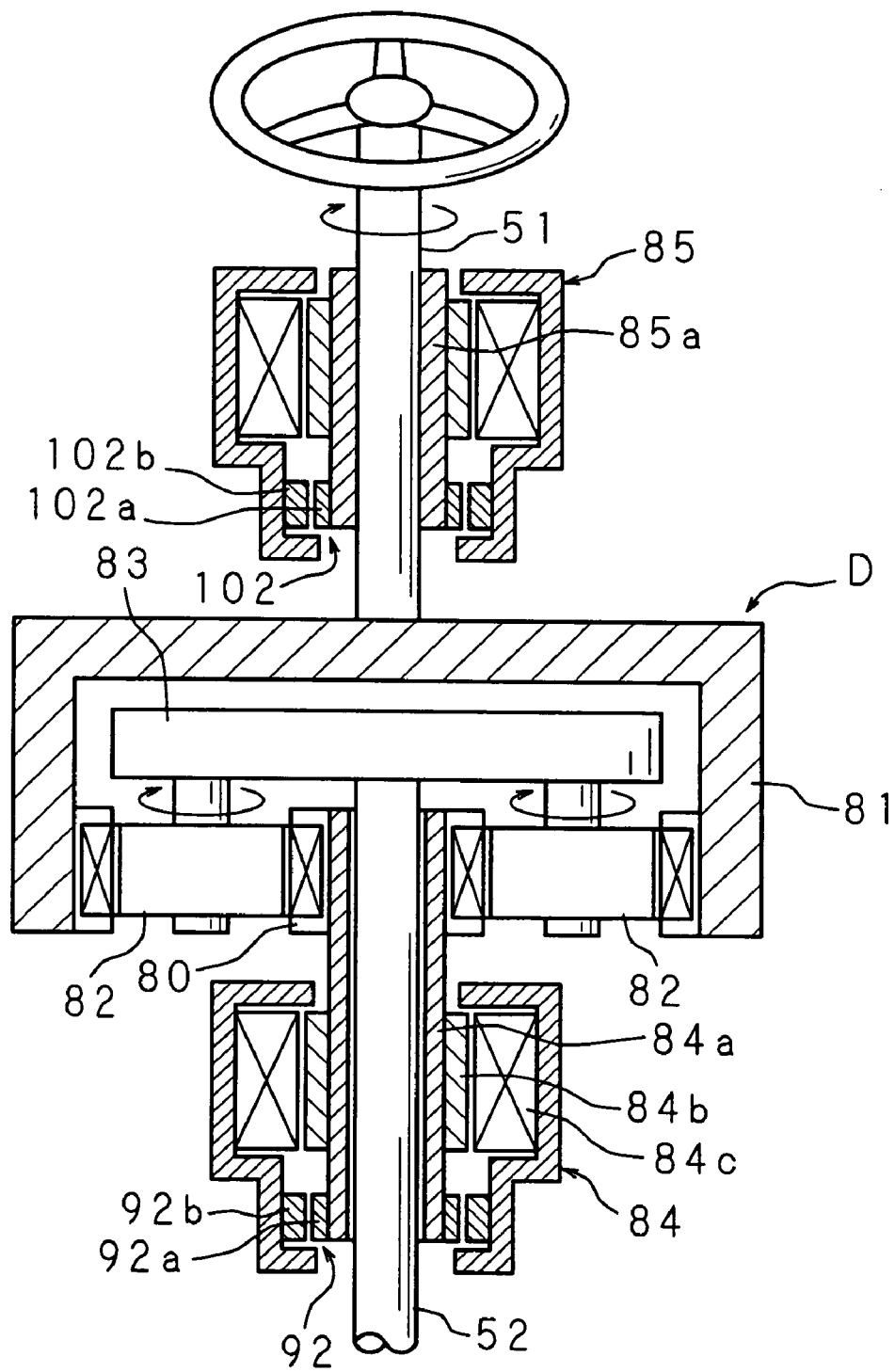
FIG. 7 is a schematic view showing a construction of the vehicle steering apparatus according to Embodiment 3 of the present invention.

FIG. 7 is a schematic view showing a construction of Embodiment 3 of the vehicle steering apparatus according to the present invention. This vehicle steering apparatus includes a differential mechanism D, a first electric motor 84 and a second electric motor 85. Herein, the differential mechanism D has an input shaft 51 and output shaft 52 which are coaxially arranged so as to be freely rotatable, a sun gear 80 which is fitted to and supported on the output shaft 52 so as to be freely rotatable, an internal gear 81 which is arranged around an outer periphery of the sun gear 80 so as to be freely rotatable and is interlockingly coupled with the input shaft 51 coaxially, plural planetary gears 82 which are meshed with the sun gear 80 and the internal gear 81, and a carrier 83 which supports the planetary gears 82 and is interlockingly coupled with the output shaft 52 coaxially. The first electric motor 84 is arranged around an outer periphery of the output shaft 52 and allows the sun gear 80 to rotate. The second electric motor 85 is driven when a steering torque applied to the input shaft 51 is changed from an appropriate steering torque, and applies a required torque to the input shaft 51 in accordance with a torque applied to the output shaft 52, and the like.

In Embodiment 3, the internal gear 81 is formed of a bottomed cylindrical shape having teeth at its inner circumference. The input shaft 51 is coupled to a center portion at a bottom of the internal gear 81. The sun gear 80 is integrally formed with a cylindrical rotor 84a. A permanent magnet 84b is provided on an outer periphery of the rotor 84a. A stator 84c is provided around an outer periphery of the permanent magnet 84b. The carrier 83 is formed of a disc shape, and the planetary gears 82 are symmetrically supported at two deflected positions from the center of the carrier 83.

Each of the sun gear 80, internal gear 81 and planetary gears 82 in the differential mechanism D is constituted of a spur gear. When it is assumed that the number of teeth Z5 of the sun gear 80 is 11 and the number of teeth Z6 of the internal gear 81 is 45, a torque ratio between a torque applied to the output shaft 52 and a torque applied to the input shaft 51 in the case where rotation of the input shaft 51 is transmitted to the output shaft 52 is calculated from the following expression:

$$Z6/(Z6+Z5).$$

This torque ratio is set to an appropriate toque ratio ranging from 1:0.7 to 1:0.9, like Embodiment 2.

The first electric motor 84 has a first position detector 92 which detects a position of the rotor 84a, and the second electric motor 85 has a rotor 85a and a second position detector 102 which detects a position of the rotor 85a.

In Embodiment 3, the input shaft 51 is rotated, so that the output shaft 52 rotates while decreasing its rotational speed via the internal gear 81, the planetary gears 82 and the carrier 83. In addition, the first electric motor 84 is driven by an instruction signal output from the controller 55 to a drive circuit, so that the output shaft 52 rotates while increasing its rotational speed via the sun gear 80, the planetary gears 82 and the carrier 83. When a steering torque applied to the input shaft 51 is changed from an appropriate steering torque by this increase in the rotational speed of the output shaft 52, the second electric motor 85 is driven by an instruction signal output from the controller 55 to a drive circuit in accordance with a torque applied to the output shaft 52, and the like. For example, a reaction force torque in the same direction as the rotational direction of the input shaft 51 is applied to the input shaft 51. As a result, the torque ratio can be maintained at a predetermined value ranging from 1:0.7 to 1:0.9, and a steering torque applied to the input shaft 51 can be maintained at an appropriate value.

The other arrangements and actions are identical to those of Embodiment 2 and will be described in no more detail while like components are denoted by like numeral.

In the aforementioned Embodiment 2 and Embodiment 3, a resolver is provided as the first and second position detectors 92 and 102. However, the present invention is not limited thereto, and other component such as a rotary encoder or a Hall element may be provided.

As this invention may be embodied in several forms without departing from the spirit of essential characteristics thereof, the present embodiments are therefore illustrative and not restrictive, since the scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A rotation transmitting apparatus comprising:
a first sun gear;
a second sun gear supported in coaxial with the first sun gear;
a first planetary gear meshed with the first sun gear;
a second planetary gear meshed with the second sun gear and rotating with the first planetary gear;
a carrier supporting the first planetary gear and second planetary gear so as to be rotatable about the respective axes, and rotating in coaxial with the first sun gear and second sun gear; and
a motor varying a rotational speed of rotation transmitted by each of the gears, wherein the motor is disposed in coaxial with the first sun gear and second sun gear, and the motor has a rotor integrally provided with the carrier, wherein a combined structure of the carrier and the rotor of the motor is a unitary, integral device.

2. The rotation transmitting apparatus according to claim 1, wherein
the rotor is formed of a cylindrical shape,
an input shaft rotating with the first sun gear or an output shaft rotating with the second sun gear is inserted into the rotor, and
the carrier and the rotor are disposed so as to be relatively rotatable in coaxial with the input shaft or the output shaft.

3. A vehicle steering apparatus comprising:
an input shaft connected to steering means;
an output shaft interlockingly coupled to the input shaft by a differential mechanism and connected to a steering mechanism;
a first actuator allowing part of the differential mechanism to rotate; and
a second actuator applying a required torque to the input shaft in accordance with a torque applied to the output shaft, wherein
the first actuator includes a first electric motor having a first position detector for detecting a rotational position of a rotor, and
the second actuator includes a second electric motor having a second position detector for detecting a rotational position of another rotor.

4. The vehicle steering apparatus according to claim 3, further comprising:
a torque sensor detecting a torque applied to the input shaft, around the input shaft and on a side closer to the steering means than a portion where the input shaft is interlockingly coupled to the differential mechanism.

5. A vehicle steering apparatus comprising:
an input shaft connected to steering means;
an output shaft interlockingly coupled to the input shaft by a differential mechanism and connected to a steering mechanism;
a first actuator allowing part of the differential mechanism to rotate;
a second actuator applying a required torque to the input shaft in accordance with a torque applied to the output shaft, wherein the first actuator includes a first electric motor having a first position detector for detecting a rotational position of a rotor, and the second actuator includes a second electric motor having a second position detector for detecting a rotational position of another rotor;
a first reduction mechanism disposed between the first electric motor and the differential mechanism;
a second reduction mechanism disposed between the second electric motor and the input shaft; and
calculation means for calculating a rotational angle of the input shaft and that of the output shaft on the basis of positions respectively detected by the first and second position detectors, a reduction ratio of the first reduction mechanism, and a reduction ratio of the second reduction mechanism.

6. The vehicle steering apparatus according to claim 5, further comprising:
a torque sensor detecting a torque applied to the input shaft, around the input shaft and on a side closer to the steering means than a portion where the input shaft is interlockingly coupled to the differential mechanism.

7. A vehicle steering apparatus comprising:
an input shaft connected to a steering unit;
an output shaft interlockingly coupled to the input shaft by a differential mechanism and connected to a steering mechanism;
a first actuator allowing part of the differential mechanism to rotate; and
a second actuator applying a required torque to the input shaft in accordance with a torque applied to the output shaft, wherein
the first actuator includes a first electric motor having a first position detector for detecting a rotational position of a rotor, and
the second actuator includes a second electric motor having a second position detector for detecting a rotational position of another rotor.

8. The vehicle steering apparatus according to claim 7, further comprising:
a torque sensor detecting a torque applied to the input shaft, around the input shaft and on a side closer to the steering unit than a portion where the input shaft is interlockingly coupled to the differential mechanism.

9. A vehicle steering apparatus comprising:
an input shaft connected to a steering unit;
an output shaft interlockingly coupled to the input shaft by a differential mechanism and connected to a steering mechanism;
a first actuator allowing part of the differential mechanism to rotate;
a second actuator applying a required torque to the input shaft in accordance with a torque applied to the output shaft, wherein the first actuator includes a first electric motor having a first position detector for detecting a rotational position of a rotor, and the second actuator includes a second electric motor having a second position detector for detecting a rotational position of another rotor;
a first reduction mechanism disposed between the first electric motor and the differential mechanism;
a second reduction mechanism disposed between the second electric motor and the input shaft; and
a controller capable of performing an operation of calculating a rotational angle of the input shaft and that of the output shaft on the basis of positions respectively detected by the first and second position detectors, a reduction ratio of the first reduction mechanism, and a reduction ratio of the second reduction mechanism.

10. The vehicle steering apparatus according to claim 9, further comprising:
a torque sensor detecting a torque applied to the input shaft, around the input shaft and on a side closer to the steering unit than a portion where the input shaft is interlockingly coupled to the differential mechanism.

11. A rotation transmitting apparatus comprising:
a first sun gear;
a second sun gear supported in coaxial with the first sun gear;
a first planetary gear meshed with the first sun gear;
a second planetary gear meshed with the second sun gear and rotating with the first planetary gear;
a carrier supporting the first planetary gear and second planetary gear so as to be rotatable about the respective axes, and rotating in coaxial with the first sun gear and second sun gear; and
a motor varying a rotational speed of rotation transmitted by each of the gears, wherein the motor is disposed in coaxial with the first sun gear and second sun gear, and the motor has a rotor integrally provided with the carrier,
wherein the carrier directly extends from the rotor of the motor.

12. A rotation transmitting apparatus comprising:
a first sun gear;
a second sun gear supported in coaxial with the first sun gear;
a first planetary gear meshed with the first sun gear;
a second planetary gear meshed with the second sun gear and rotating with the first planetary gear;
a carrier supporting the first planetary gear and second planetary gear so as to be rotatable about the respective axes, and rotating in coaxial with the first sun gear and second sun gear; and
a motor varying a rotational speed of rotation transmitted by each of the gears, wherein the motor is disposed in coaxial with the first sun gear and second sun gear, and the motor has a rotor integrally provided with the carrier,
wherein the carrier is in contact with the rotor of the motor.

* * * * *